US010867192B1

(12) United States Patent
Song et al.

(10) Patent No.: US 10,867,192 B1
(45) Date of Patent: Dec. 15, 2020

(54) REAL-TIME ROBUST SURROUND VIEW PARKING SPACE DETECTION AND TRACKING

(71) Applicant: Black Sesame International Holding Limited, Santa Clara, CA (US)

(72) Inventors: Yilin Song, San Jose, CA (US); Zuoguan Wang, Los Gatos, CA (US); Qun Gu, San Jose, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 0 days.

(21) Appl. No.: 16/533,422

(22) Filed: Aug. 6, 2019

(51) Int. Cl.
| | |
|---|---|
| *G06K 9/00* | (2006.01) |
| *H04N 5/225* | (2006.01) |
| *H04N 5/232* | (2006.01) |
| *B60R 11/04* | (2006.01) |
| *G06K 9/62* | (2006.01) |

(52) U.S. Cl.
CPC ..... *G06K 9/00812* (2013.01); *G06K 9/00798* (2013.01); *G06K 9/622* (2013.01); *H04N 5/2253* (2013.01); *H04N 5/23238* (2013.01); *B60R 11/04* (2013.01); *G06K 2209/21* (2013.01)

(58) Field of Classification Search
CPC ........... H04N 5/23238; G06K 9/00812; G06K 9/00798
See application file for complete search history.

(56) References Cited

U.S. PATENT DOCUMENTS

| | | | | |
|---|---|---|---|---|
| 8,134,479 | B2* | 3/2012 | Suhr | G06K 9/00812 |
| | | | | 340/436 |
| 8,300,889 | B2* | 10/2012 | Jung | G06T 7/74 |
| | | | | 348/169 |
| 9,467,645 | B2* | 10/2016 | Yoon | G08G 1/14 |
| 9,864,915 | B2* | 1/2018 | Lee | B60R 1/00 |
| 2009/0207045 | A1* | 8/2009 | Jung | G06K 9/00798 |
| | | | | 340/932.2 |
| 2009/0243889 | A1* | 10/2009 | Suhr | G06K 9/00812 |
| | | | | 340/932.2 |
| 2013/0265429 | A1* | 10/2013 | Yoon | G08G 1/14 |
| | | | | 348/148 |
| 2014/0085112 | A1* | 3/2014 | Gruteser | B60Q 9/004 |
| | | | | 340/932.2 |
| 2016/0034768 | A1* | 2/2016 | Lee | B60R 1/00 |
| | | | | 348/38 |
| 2020/0062242 | A1* | 2/2020 | Hayakawa | G08G 1/143 |

\* cited by examiner

*Primary Examiner* — Christopher S Kelley
*Assistant Examiner* — Boubacar Abdou Tchoussou
(74) *Attorney, Agent, or Firm* — Timothy T. Wang; Ni, Wang & Massand, PLLC

(57) ABSTRACT

A method of parking lot tracking including receiving a plurality of camera images from a plurality of cameras attached to a vehicle in motion, stitching the plurality of camera images to simulate a surround view of the vehicle, recognizing at least one potential parking space within the surround view of the vehicle, estimating a motion parameter by camera motion estimation of the plurality of cameras and tracking the at least one potential parking space based on the motion parameter.

11 Claims, 8 Drawing Sheets

REAL-TIME ROBUST SURROUND VIEW PARKING SPACE DETECTION AND TRACKING

BACKGROUND

Technical Field

The instant disclosure is related to automated parking assist (APA) systems and specifically utilizing optical detection for APA parking spot detection and tracking.

Background

An automatic parking assist is an apparatus for enhancing driver's safety and comfort by locating parking spots in a space limited environment. Current automatic parking assistants rely on ultrasonic detection for obstacle detection and parking spot localization. Ultrasonic detection suffers from the similar issues as radar detection. For example, a radar may discriminate distance to obstacles rather than exploit visual cues such as lanes and signs. Additionally, radar detection suffers from a limited range compared to optical detection. Thus ultrasonic or radar detection hampers the use of existing automatic parking assistant systems to in situations where a vacant parking spot has cars parked on either side.

Therefore, to better assist human drivers, a method and computer readable medium are sought which generate a robust optical detection signal in varying conditions.

SUMMARY

A first example of parking spot detection, comprising at least one of receiving a plurality of camera images from a plurality of cameras attached to a vehicle in motion, stitching the plurality of camera images to simulate a surround view of the vehicle, recognizing at least one potential parking space within the surround view of the vehicle, estimating a motion parameter by camera motion estimation of the plurality of cameras and tracking the at least one potential parking space based on the motion parameter.

A second example non-transitory computer readable medium comprising instructions that, when read by a processor, cause the processor to perform at least one of receiving a plurality of camera images from a plurality of cameras attached to a vehicle in motion, stitching the plurality of camera images to simulate a surround view of the vehicle, recognizing at least one potential parking space within the surround view of the vehicle, estimating a motion parameter by camera motion estimation of the plurality of cameras, tracking the at least one potential parking space based on the motion parameter, determining a location of the at least one potential parking space, determining an amount of free space surrounding the at least one potential parking space, determining a direction from a vehicle location to the at least one potential parking space, determining a distance from the vehicle location to the at least one potential parking space, determining two entrance corners of the at least one potential parking space, clustering the at least one potential parking space into a set of clusters and selecting one of the set of clusters based on distance thresholding.

DETAILED DESCRIPTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
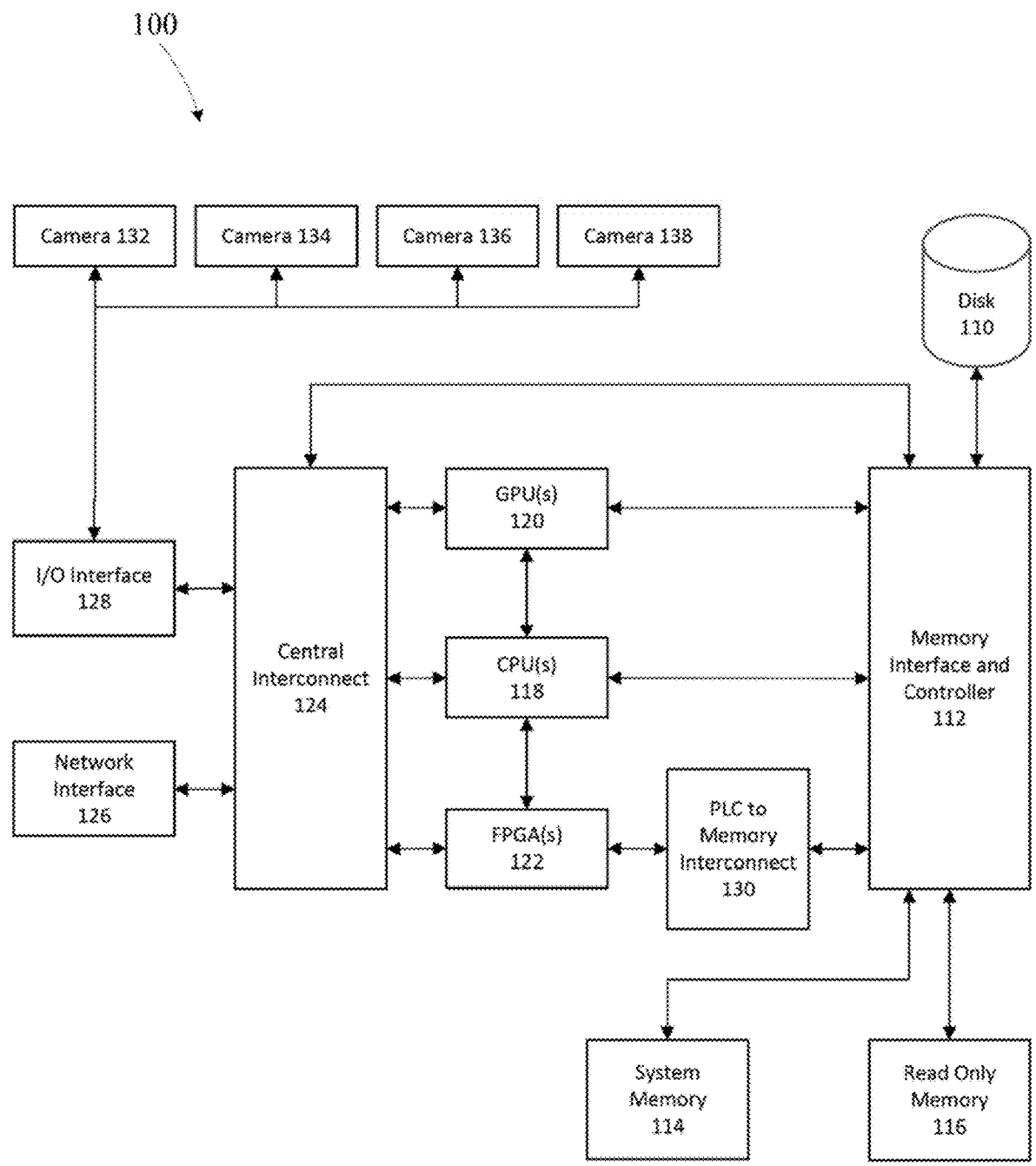
FIG. 1 is a first example system diagram in accordance with one embodiment of the disclosure.

FIG. 1 depicts an example automated parking assistance system 100 that may be used to implement deep neural nets associated with the operation of one or more portions or steps of processes 700 and 800. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a deep neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
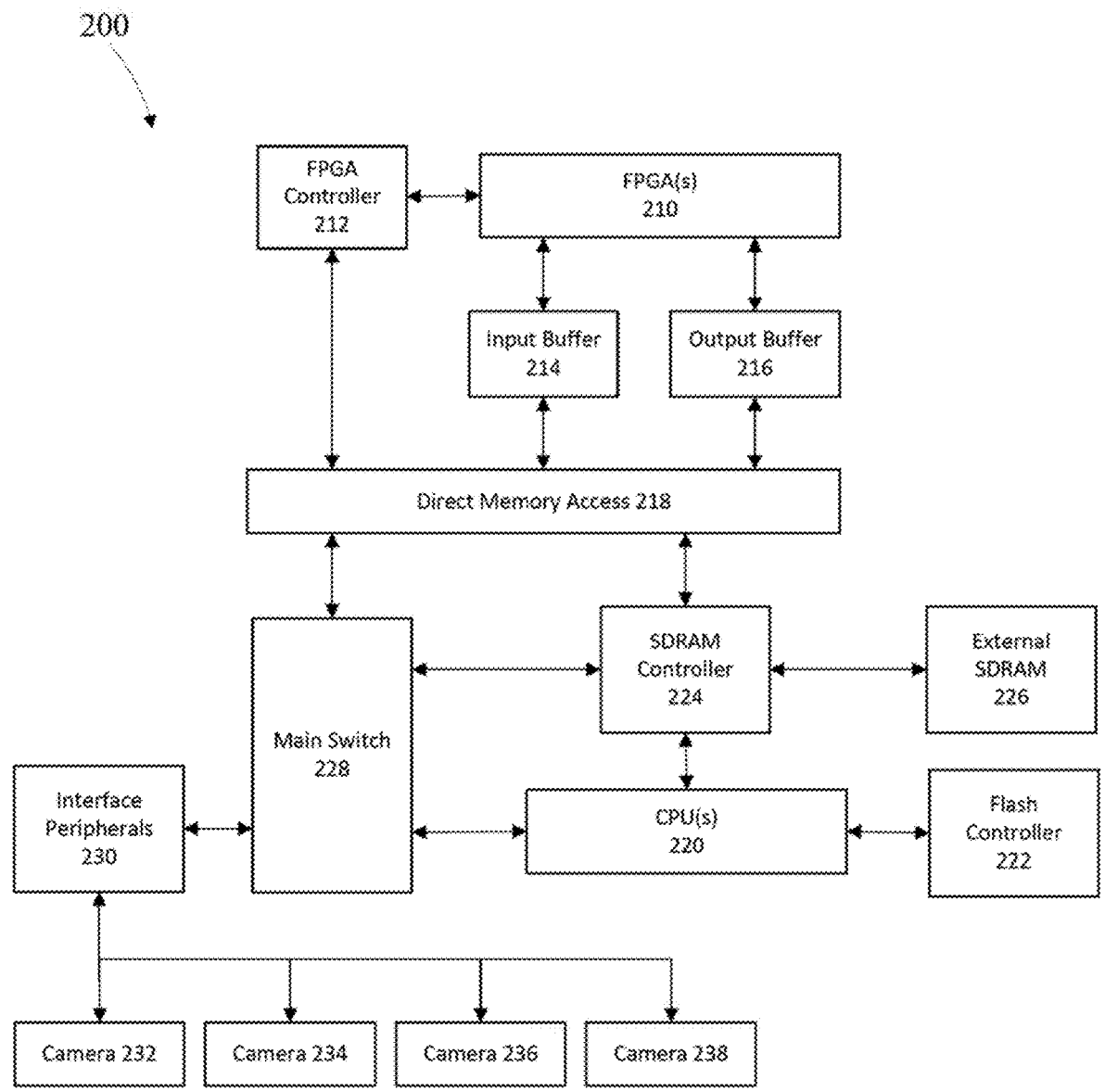
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 connected to cameras 132-138 and the network interface 126.

FIG. 2 depicts a second example hybrid computational system 200 that may be used to implement neural nets associated with the operation of one or more portions or steps of flow 500. In this example, the processors associated with the system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, the buffers are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230 connected to cameras 232-238. A flash controller 222 controls persistent memory and is connected to the CPU 220.

Figure 3:
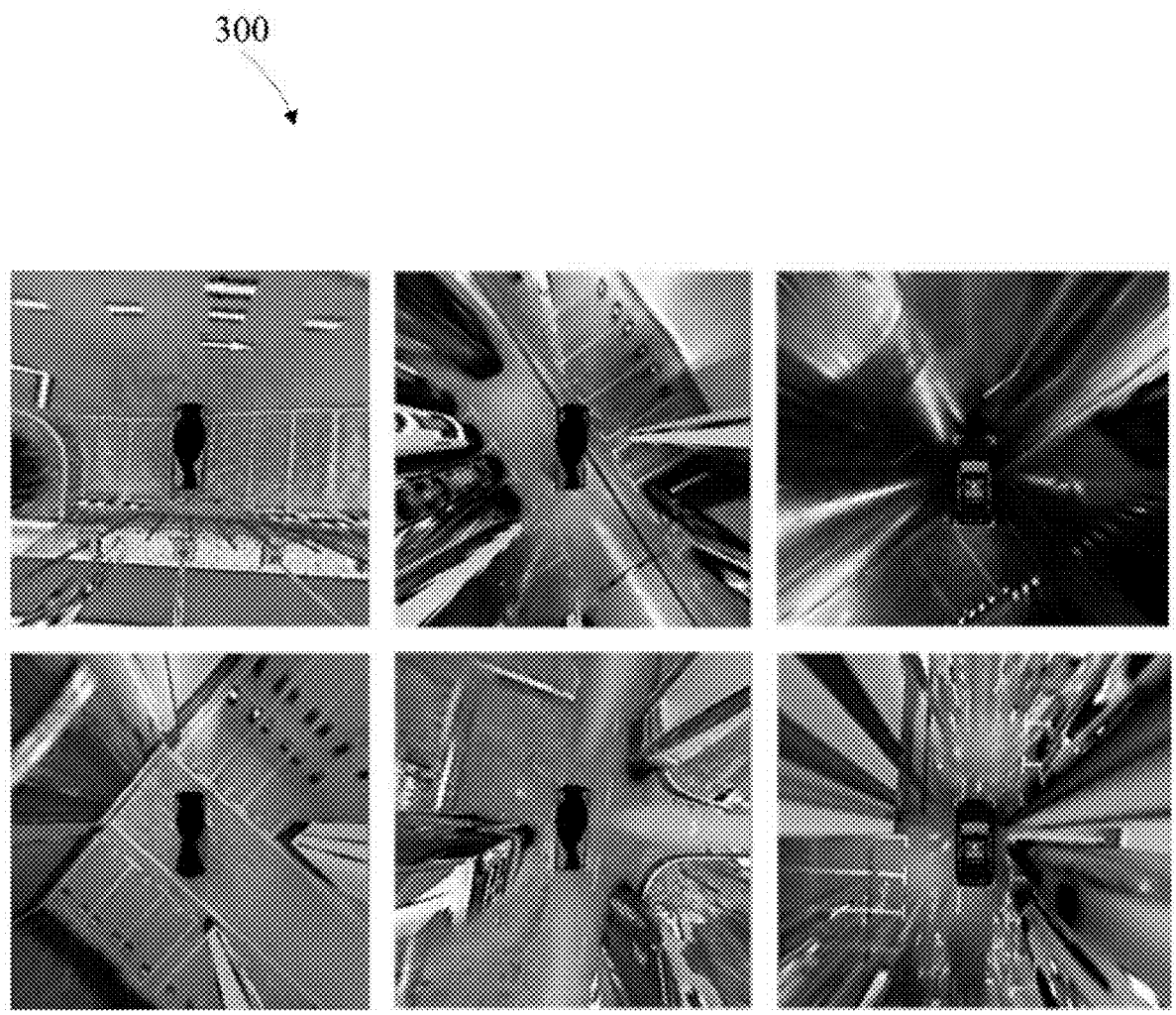
FIG. 3 is an example of stitched camera views in accordance with one embodiment of the disclosure.

FIG. 3 discloses a bird's eye view of the stitched view of the disclosed system. The disclosed system generates a robust optical detection signal in varying conditions as shown, including, but not limited to, unclear lane marking, severe light reflection and overcast or poorly lit conditions. The system photographs are provided by a plurality of cameras which emphasize a downward view. In this example there are four cameras, on the respective four sides of the vehicle.

The disclosed system detects and tracks available parking spaces and drivable free-space areas on stitched video sequences generated from four cameras installed on the sides of a vehicle. A deep neural network is used to predict parking space for a particular frame. The disclosed approach utilizes a bottom up information fusion. The disclosed model predicts low level output such as lines, angles, distances and the like and follows designed rules to convert low level output to final parking spot detections. As vehicle and surrounding objects may be moving, as a tracking framework updates identified parking spot's location as time progresses. To increase tracking efficiency, camera motion is utilized to estimate parking spot locations in upcoming frames.

The disclosed system utilizes cameras as detection sensors. A surround view system utilizes four cameras installed on the sides of a vehicle. To accurately estimate the location of an obstacle, parking lane, sign, camera calibration techniques are utilized to generate the stitched view shown in FIG. 3.

Obstacles in surround view images are subject to prospective projection distortion which increases the challenge in detecting obstacles in a surround view image. The disclosed system may predict drivable space as well as locate vacant parking spots. The disclosed system may also track multiple vacant parking spots simultaneously even when the parking spaces are severely occluded by obstacles. The system is computational efficient. The disclosed detection and tracking system is also robust to lighting conditions and drastic movements. This assists downstream path planning and the control module.

System Overview

In this section we give a brief overview of the general structure of this bottom up approach for parking space detection. A deep neural network is used to predict parking space for a particular frame. The disclosed approach uses a bottom up information fusion. This bottom up information fusion predicts low level output like lines, angles, distance and the like and follows designed rules to convert low level output to final parking spot detections. As vehicle and surrounding objects may be moving, a tracking framework is designed to update located parking spot's location as time progresses. To increase tracking efficiency, camera motion is utilized to estimate parking spot location in upcoming frames.

Figure 4:
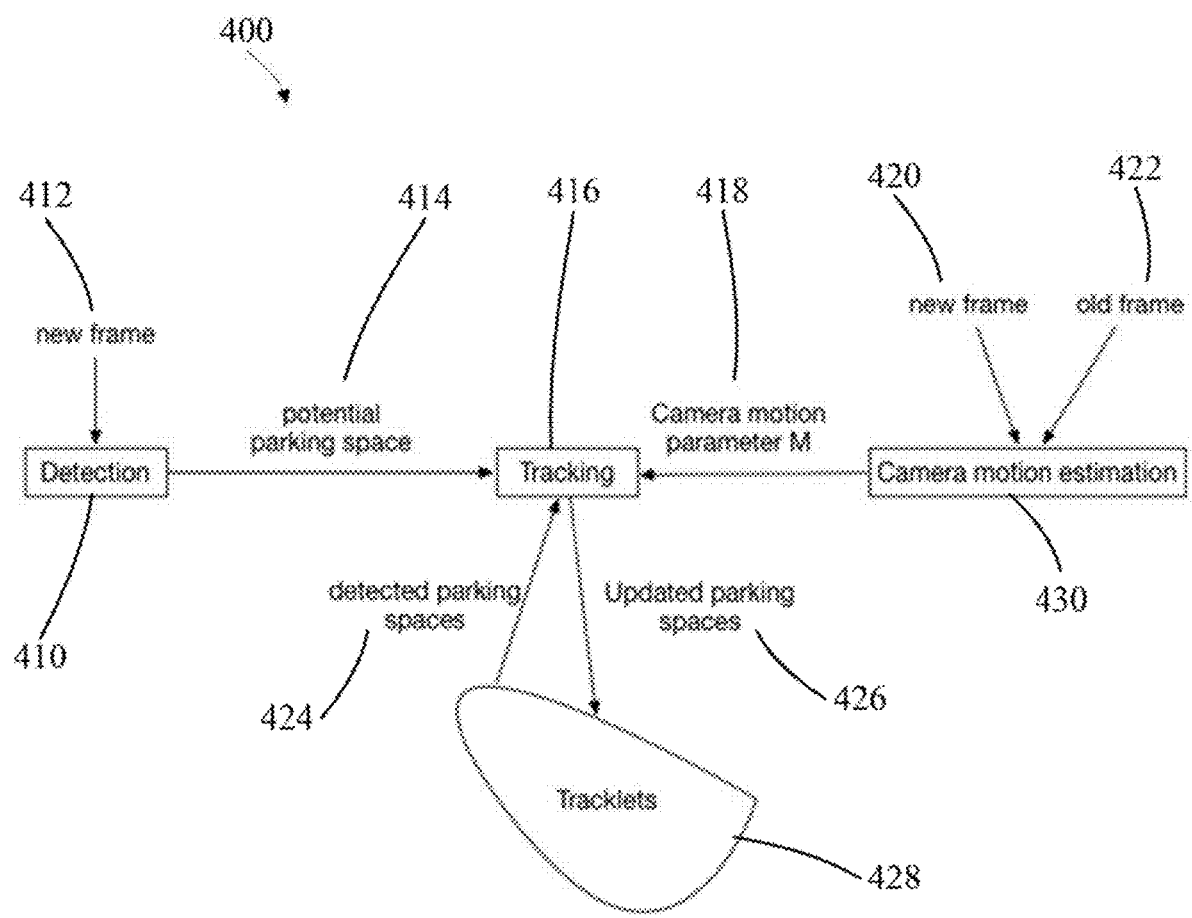
FIG. 4 is an example system overview in accordance with one embodiment of the disclosure.

FIG. 4 depicts an example general overview of the system 400. The detection module 410 is comprised in part of multiple cameras that provide anew frame 412. The system analyzes the photos provided by the multiple cameras and stitches them together. Potential parking spaces are identified 414 by the processor, in this case a GPU. Tracking of the vehicle is provided by analyzing the new frame 420 and old frame 422 to provide a camera motion estimation 430 which sends a camera motion parameter 418 to a tracking module 416. Previously detected parking spaces 424 are updated 426 in position and location with respect to the vehicle. The relative position of the vehicle and the potential parking spaces are captured by tracklets 428 that identify movement, location and the like.

Detection Module

The detection module utilizes a semantic segmentation network design to predict two entrance corners of parking spots. For parking entrances, the corresponding direction and distance to its corresponding stopping point is predicted. Furthermore, the system predicts the available free-space to indicate which area is safest to drive. The model fusion process is shown in FIG. 5.

Figure 5:
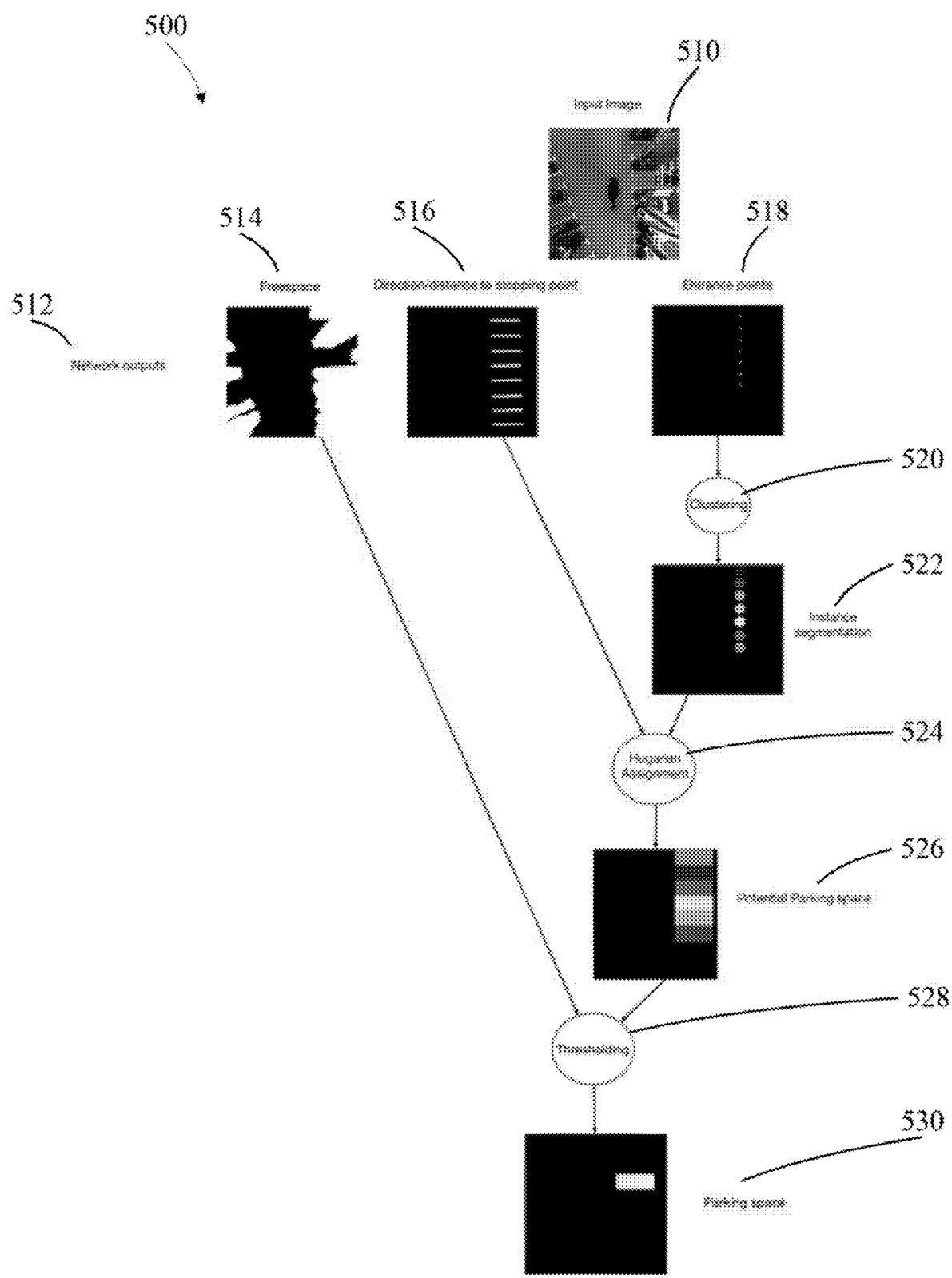
FIG. 5 is an example model fusion for parking space detection in accordance with one embodiment of the disclosure.

In FIG. 5, entrance point and free-space are semantically predicted. To generate parking space instance, the entrance points are clustered and assigned a label. As parking spaces have two entrance points and the shape of the parking space is confined by certain rules, a cost function for Hungarian algorithm, i.e. Kuhn-Munkres algorithm, is utilized to find the optimal match among the entrance points. The Hungarian algorithm provides maximum-weight matchings in bipartite graphs and provides a solution to the assignment problem in polynomial time. Among the potential parking spaces, a percentage of free-space is utilized within potential parking spots as an indicator as to whether this is an available parking spot.

FIG. 5 depicts a flow 500 to locate and select a parking space. An image is received 510 from the cameras and a bird's eye view is created. The image is analyzed and free space is identified 514, possible parking spots and the respective the direction and distance to stopping point are determined 516. The edges of the parking spots are further analyzed to determine entrance points 518. Based on the entrance points a clustering 520 is performed leading to parking instance segmentation 522. The direction and distance to stopping points from 516 and the instance segmentation from 522 are fed into a Hungarian assignment engine 524 that outputs potential parking spaces 526. Given the identified free space from 510 and the potential parking spaces identified in 522, a thresholding 528 of distance from the current vehicle position is determined and a parking space is chosen 530.

Camera Motion Estimation

Camera motion is the inverse transformation of vehicle movement, once an estimate camera motion is found it is possible to track the parking spot from the vehicle coordinates. One computationally intensive task is performing camera motion estimation in stitched bird's eye view space is to locate feature points on the ground. The motion pattern of non-ground level points differs from ground level points and as such is excluded. Free-space estimation is applied as a rough prediction of ground level pixels. Therefore the points in the free-space region are utilized to determine the optical flow to determine camera motion.

Tracking

Camera motion is utilized to track the location of parking spaces. Past detected frames and camera motion parameters are used to update parking space locations in subsequent frames. This serves as the rough estimation of the parking spots' location in the subsequent frame. A determination is then made to determine whether the newly detected frames and the old tracking result are the same. A distance based cost function is utilized for the Hungarian algorithm. If a newly detected spot matches a transformed old parking space, the new detection location is used to update the parking space. Otherwise this would be considered as a new parking space. The general framework for tracking is shown in FIG. 6.

Figure 6:
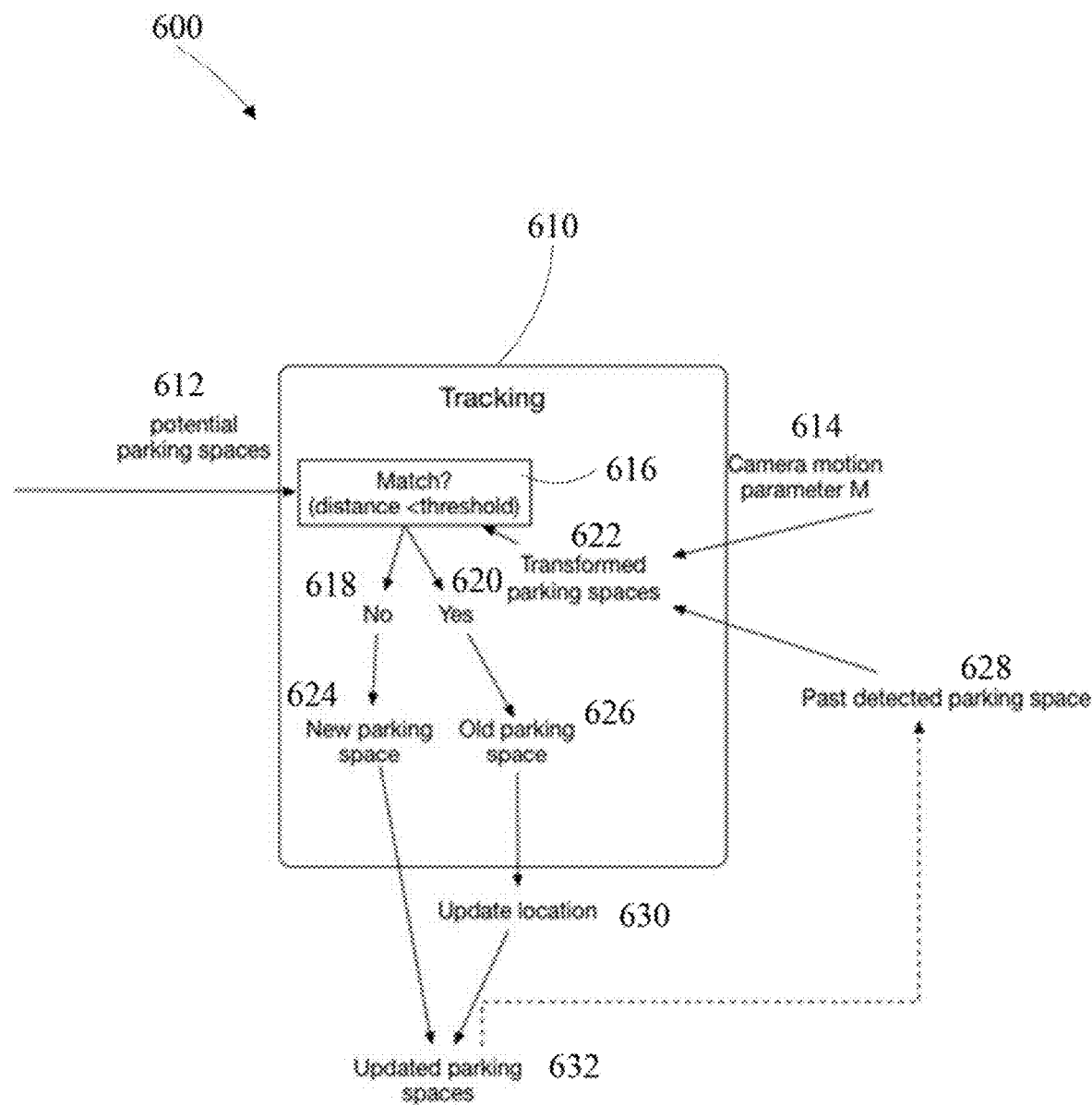
FIG. 6 is an example logic flow of tracking parking spaces in accordance with one embodiment of the disclosure.

FIG. 6 depicts an example flow of tracking parking spaces 600. The method of tracking parking spaces is performed by a tracking module 610 having a set of inputs and outputs. Potential parking spaces that have been identified are input into the tracking module 610. The camera motion parameters M 614 and previously identified parking spaces 628 are input into the module and the parking spaces are transformed 622. A matching algorithm is utilized in a sub-module 616, if the distance is less than a predetermined threshold, a match is made 620 in which the old parking space 626 receives a location update 630 and is inputted into updated parking spaces 632. If the matching algorithm finds that the distance is not greater than the predetermined threshold 618 then a new parking space is assigned 624 to the potential parking space and is inputted into the updated parking spaces 632. The updated parking spaces 632 are fed into past detected parking spaces 628.

Figure 7:
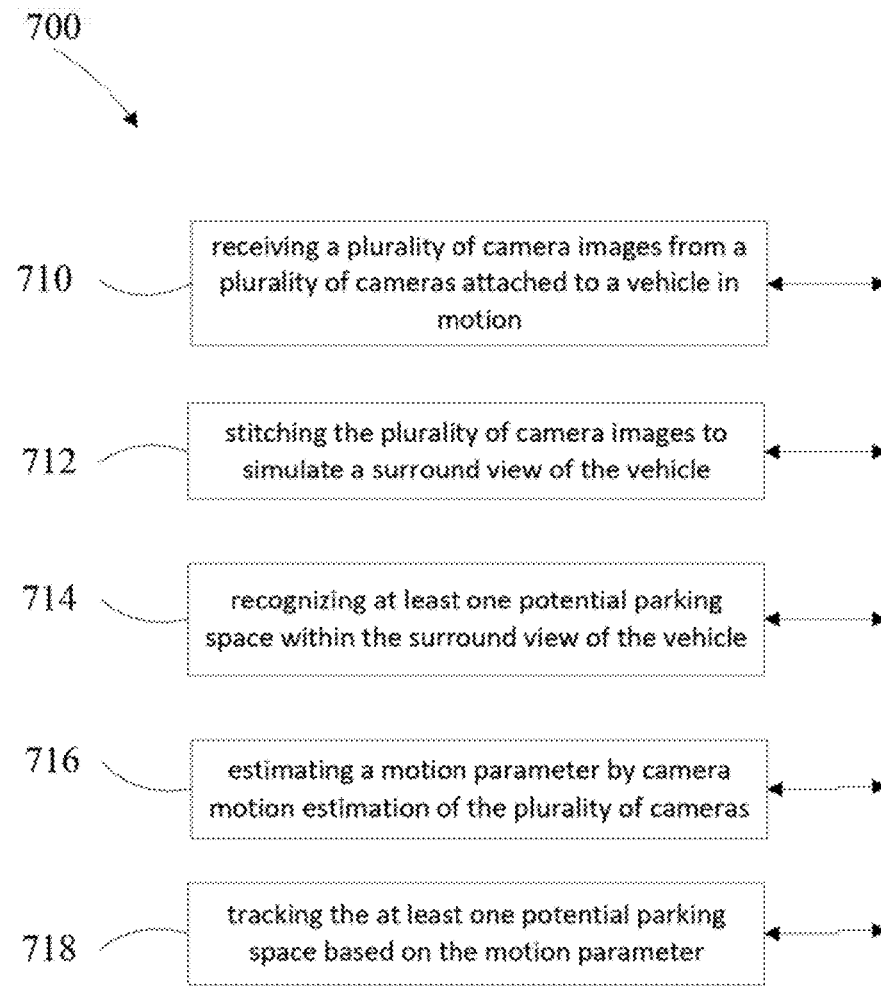
FIG. 7 is a first example method of parking space detection in accordance with one embodiment of the disclosure.

FIG. 7 depicts an example method of parking space tracking 700 including receiving 710 a plurality of camera images from a plurality of cameras attached to a vehicle in motion and stitching 712 the plurality of camera images to simulate a surround view of the vehicle. The method includes recognizing 714 at least one potential parking space within the surround view of the vehicle, estimating 716 a motion parameter by camera motion estimation of the plurality of cameras and tracking 718 the at least one potential parking space based on the motion parameter.

The example method may also include determining a location, direction and distance from the vehicle location of the at least one potential parking space. The method may also prove determining two entrance corners of the at least one potential parking space, clustering the at least one potential parking space into a set of clusters, segmenting the set of clusters of the at least one potential parking space, ranking the set of clusters based on combinatorial optimization and selecting one of the set of clusters based on distance thresholding.

Figure 8:
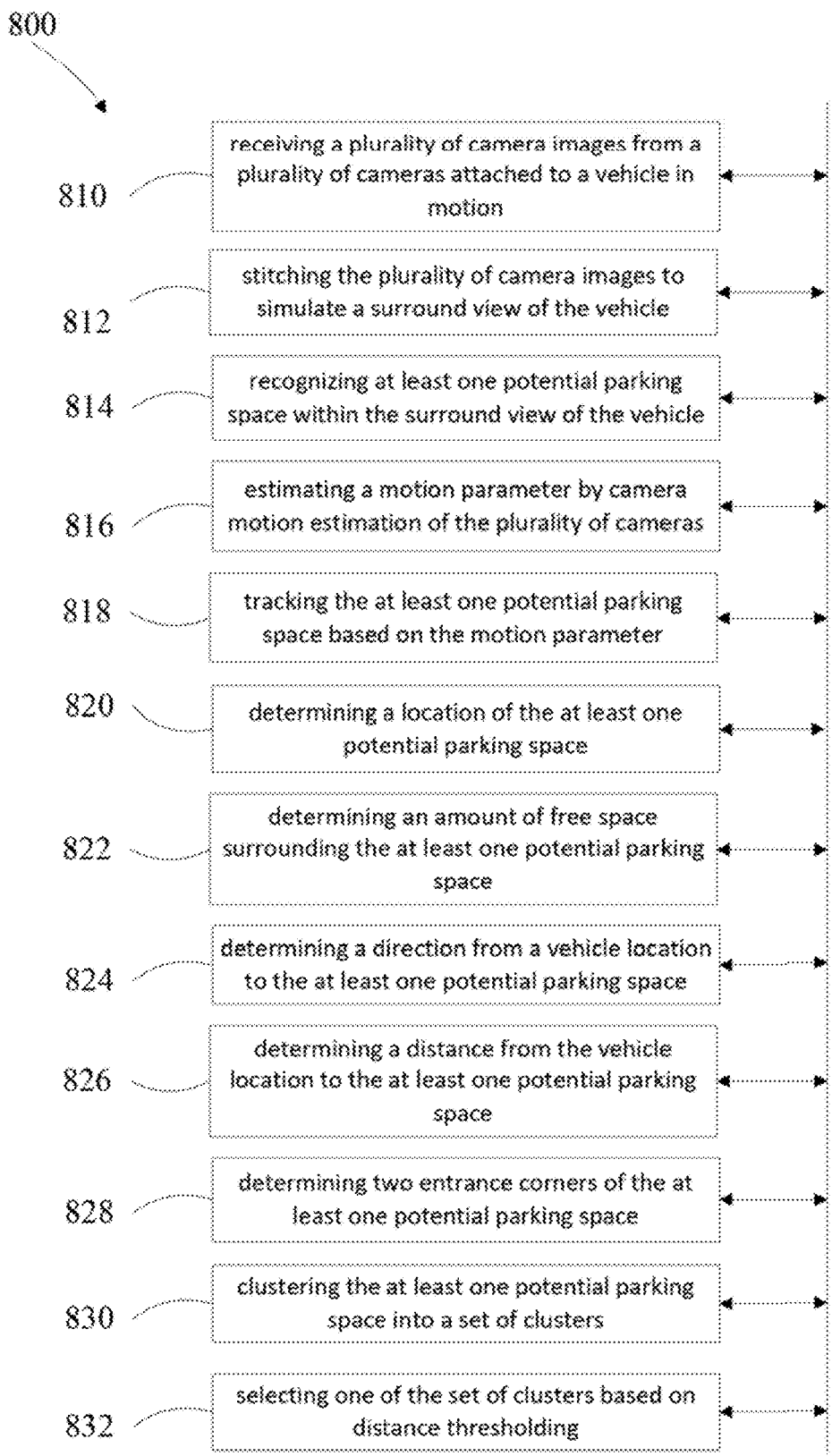
FIG. 8 is a second example method of parking space detection in accordance with one embodiment of the disclosure.

FIG. 8 depicts an example non-transitory computer readable medium 800 comprising instructions that, when read by a processor, cause the processor to perform receiving 810 a plurality of camera images from a plurality of cameras attached to a vehicle in motion and stitching 812 the plurality of camera images to simulate a surround view of the vehicle. The computer instructions also include recognizing 814 at least one potential parking space within the surround view of the vehicle, estimating 816 a motion parameter by camera motion estimation of the plurality of cameras and tracking 818 at least one potential parking space based on the motion parameter. The computer instructions further comprise determining 820 a location of the at least one potential parking space, determining 822 an amount of free space surrounding the at least one potential parking space and determining 824 a direction from a vehicle location to the at least one potential parking space. The computer instructions further include determining 826 a distance from the vehicle location to the at least one potential parking space, determining 828 two entrance corners of the at least one potential parking space, clustering 830 the at least one potential parking space into a set of clusters and selecting 832 one of the set of clusters based on distance thresholding.

Those of skill in the art would appreciate that the various illustrative blocks, modules, elements, components, methods, and algorithms described herein may be implemented as electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the at will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method, comprising:
   receiving a plurality of camera images from a plurality of cameras attached to a vehicle in motion;
   stitching the plurality of camera images to simulate a surround view of the vehicle;
   recognizing at last one potential parking space within the surround view of the vehicle;
   determining an available free-space via the surround view of the vehicle to indicate which area is safest to drive to the at last one potential parking space;
   determining a percentage of free-space within the at last one potential parking space to indicate whether the at last one potential parking space is available;
   estimating a motion parameter by camera motion estimation of the plurality of cameras;
   tracking the at last one potential parking space based on the motion parameter to indicate a relative position of the vehicle and the at last one potential parking space as tracklets;
   determining a location of the at least one potential parking space;
   determining an amount of free space surrounding the at last one potential parking space;
   determining a direction from a vehicle location to the at last one potential parking space;
   determining a distance from the vehicle location to the at last one potential parking space;
   determining two entrance corners of the at least one potential parking space; and
   clustering the at least one potential parking space into a set of clusters indicating entrance points.

2. The method of claim 1, further comprising updating the location of the at last one potential parking space based on the camera motion estimation.

3. The method of claim 1, further comprising determining a stopping point from the vehicle location to the at last one potential parking space.

4. The method of claim 1, further comprising segmenting the set of clusters of the at last one potential parking space.

5. The method of claim 4, further comprising ranking the set of clusters based on combinatorial optimization.

6. The method of claim 5, further comprising selecting one of the set of clusters based on distance thresholding.

7. A non-transitory computer readable medium comprising instructions that, when read by a processor, cause the processor to perform:
receiving a plurality of camera images from a plurality of cameras attached to a vehicle in motion;
stitching the plurality of camera images to simulate a surround view of the vehicle;
recognizing at last one potential parking space within the surround view of the vehicle;
determining an available free-space via the surround view of the vehicle to indicate which area is safest to drive to the at last one potential parking space;
determining a percentage of free-space within the at last one potential parking space to indicate whether the at last one potential parking space is available;
estimating a motion parameter by camera motion estimation of the plurality of cameras;
tracking the at last one potential parking space based on the motion parameter to indicate a relative position of the vehicle and the at last one potential parking space as tracklets;
determining a location of the at last one potential parking space;
determining an amount of free space surrounding the at last one potential parking space;
determining a direction from a vehicle location to the at last one potential parking space;
determining a distance from the vehicle location to the at last one potential parking space;
determining two entrance corners of the at last one potential parking space;
clustering the at last one potential parking space into a set of clusters indicating entrance points; and
selecting one of the set of clusters based on distance thresholding.

8. The non-transitory computer readable medium of claim 7, further comprising segmenting the set of clusters of the at last one potential parking space.

9. The non-transitory computer readable medium of claim 8, further comprising ranking the set of clusters based on combinatorial optimization.

10. The non-transitory computer readable medium of claim 9, wherein the ranking is based on a Hungarian algorithm.

11. The non-transitory computer readable medium of claim 7, wherein the surround view of the vehicle is a bird's eye view.

* * * * *